United States Patent [19]

Thorn, deceased

[11] Patent Number: 4,461,749

[45] Date of Patent: Jul. 24, 1984

[54] PROCESSING ACID GASES

[75] Inventor: Frank H. Thorn, deceased, late of Bartlesville, Okla., by Betty H. Dalrymple, executor

[73] Assignee: Phillips Petroleum Company, Bartlesville, Okla.

[21] Appl. No.: 477,473

[22] Filed: Mar. 21, 1983

[51] Int. Cl.³ .............................................. B01D 53/34
[52] U.S. Cl. .................................... 423/228; 423/229
[58] Field of Search ................ 423/228, 229, 220, 232

[56] References Cited

U.S. PATENT DOCUMENTS 3,690,816  9/1972  Alleman .............................. 423/228
3,829,521  8/1974  Green .............................. 260/677 A
4,152,217  5/1979  Eisenberg et al. ........................ 203/2

OTHER PUBLICATIONS

Pearce, "Hydrogen Sulfide Removal with Methyl Diethanolamine" given at Gas Proc. Assoc. Meeting, New Orleans, La. 3/20-22, 1978.

Primary Examiner—Earl C. Thomas

[57] ABSTRACT

Makeup water is distilled internally in an amine gas treating unit by adding it to the reclaimer used to process a slipstream of lean amine from the stripper.

6 Claims, 1 Drawing Figure

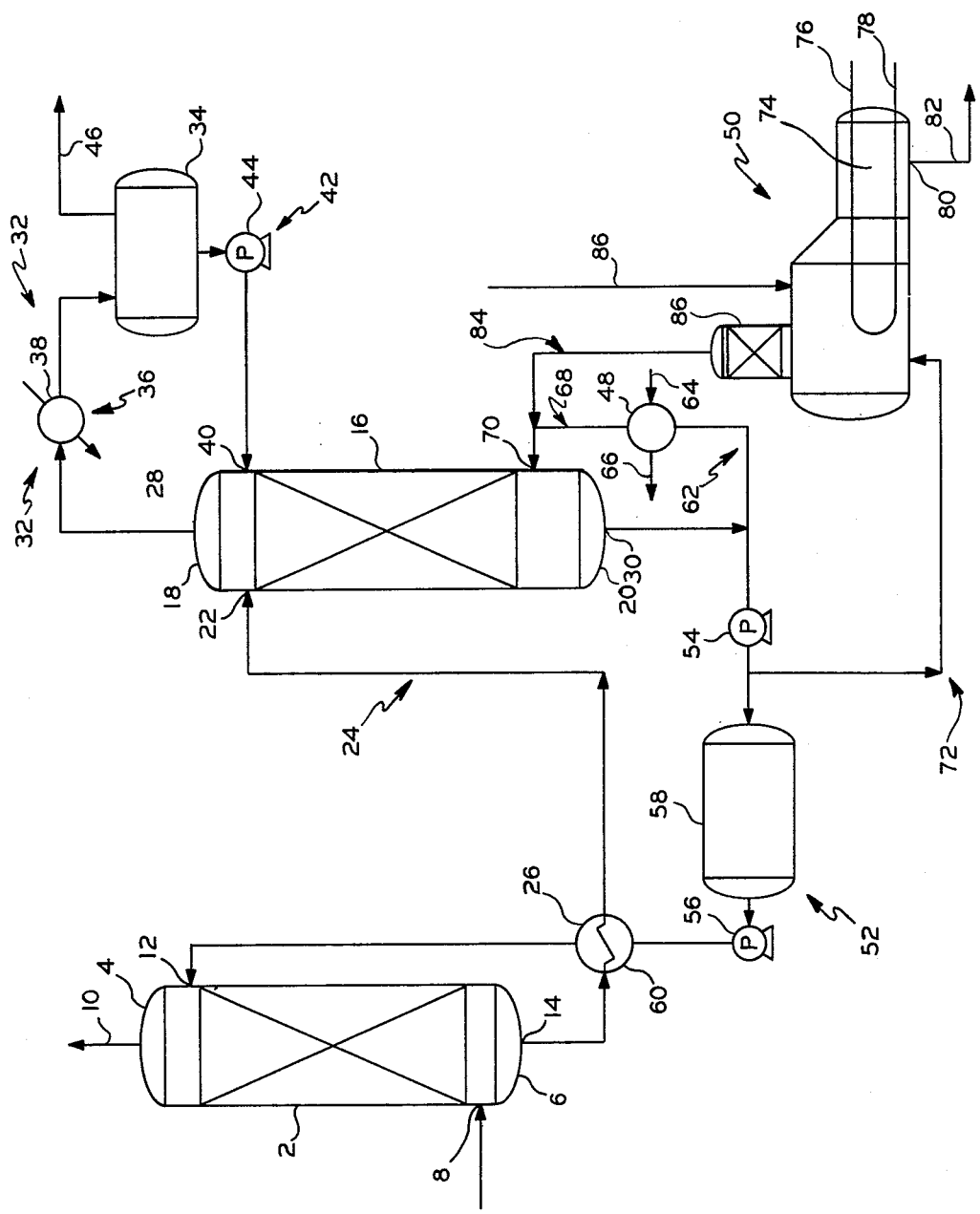

PROCESSING ACID GASES

BACKGROUND OF THE INVENTION

The invention relates to the treatment of gas streams. In another aspect, the invention relates to treating an acid gas stream with an amine solution. In yet another aspect, the invention relates to regenerating alkanolamine solution which has been used to treat acid gases.

The use of amines for the removal of hydrogen sulfide and carbon dioxide from gas streams is well known. Triethanolamine (TEA) was the first of the ethanol amines to become commercially available. It was used in the early gas treating plant. This amine has generally been replaced in gas treating plants by diethanolamine (DEA), monoethanol amine (MEA), and methyldiethanolamine (MDEA). The advantage to the use of DEA, MEA and MDEA lies in the lower molecular weights and their ability to more completely absorb hydrogen sulfide from the gas. Changeout of the working fluid of the gas treater from TEA to MEA, DEA or MDEA was also easily accomplished. Of these three amines, monoethanol amine is generally preferred because of its ability to produce sweet gas streams with extremely low hydrogen sulfide levels under the same operating conditions.

A problem encountered frequently in gas treating plants relates to replenishing water which is lost from the amine solution. It has generally been thought necessary to use condensate or water which had been distilled or in other ways treated to a very low solids content in order to maintain the gas treating unit in good operating condition. For remote treating units, the requirement of using specially treated make-up water was very burdensome.

It would thus be desirable to provide an amine treating unit in which specially treated make-up water is not required to maintain good operation. It would also be desirable to provide a process for treating streams containing acid gases which does not require specially treated make-up water.

OBJECTS OF THE INVENTION

It is an object of this invention to provide process and apparatus for treating acid gas streams where the requirement of specially treated make-up water has been obviated.

SUMMARY OF THE INVENTION

According to the invention, in a process comprising contacting a first gas stream containing at least one acid gas selected from the gas consisting of $CO_2$ and $H_2S$ with an amine solution in a contacting zone; withdrawing from the contacting zone a rich solution of the amine which is rich in the acid gas from the first gas stream; introducing the rich solution into a stripping zone to produce a second gas stream containing the at least one acid gas and water vapor and a lean amine solution which is lean in the acid gas; circulating a first portion of the lean amine solution to the contacting zone; and circulating a second portion of the lean amine solution to a distillation zone to provide a third gas stream which contains predominantly water and amine and liquid bottom stresses which contain solids; the improvement is provided which comprises introducing a stream of dissolved solids-containing make-up water into the distillation zone, the solids portion of make-up water being withdrawn from the distillation zone in the liquid bottom stream. By using this process, the make-up water is distilled internally in the unit and most any convenient source of water can be used with good results.

BRIEF DESCRIPTION OF THE DRAWING

The FIGURE illustrates schematically certain features of the present invention.

DETAILED DESCRIPTION OF THE INVENTION

According to the invention, a treating vessel such as a column 2 has an upper end 4 and a lower end 6. A vapor inlet 8 opens into the column 2 adjacent the lower end 6. A vapor outlet 10 opens from the column adjacent the upper end 4. A liquid inlet 12 opens into the column adjacent the upper end 4. A liquid outlet 14 opens from the column adjacent the lower end 6.

A vessel 16 forms a stripping zone in accordance with the invention. The vessel 16 has an upper end 18 and a lower end 20. A liquid inlet 22 opens into the vessel 16 adjacent its upper end 18. A conduit means 24 connects the liquid outlet 14 of the vessel 2 with the liquid inlet 22 of the vessel 16. The conduit means 24 preferably includes a heater 26. A vapor outlet 28 opens from the vessel 16 adjacent the upper end 18. A liquid outlet 30 opens from the vessel 16 adjacent the lower end 20.

The vapor outlet 28 is preferably connected to a means 32 for supplying reflux liquid to the column 16. The means 32 will generally comprise an accumulator vessel 34 which is connected to the vapor outlet 28 by a conduit means 36 which includes a cooler or condenser 38. The accumulator 34 is additionally connected to a liquid inlet 40 adjacent the upper end 18 of the column 16 via a conduit means 42 which will generally include a pump 44. The conduit means 42 is generally connected to the lower portion of the accumulator 34. A conduit 46 is connected to the upper portion of the accumulator 34 to carry away vapors.

The bottom 20 of the column or stripper 16 is connected to the absorber 2, a reboiler 48 and a still or reclaimer or redistillation unit 50. For the purposes of illustration, the units can be connected in the following manner.

The outlet 30 of the stripper 16 can be connected to the inlet 12 of the absorber 2 by a suitable conduit means 52 which includes a pump 54, a pump 56, a surge vessel 58 between the pump 56 and the pump 54, and a cooler 60 positioned between the pump 56 and the inlet 12, the pump 54 being positioned between the surge vessel 58 and the outlet 30 of the column 16. The cooler 60 is preferably the other side of an indirect heat exchanger from the heater 26.

The reboiler 48 can be connected to the lower end 20 of the stripper 16 by a conduit means 62 which connects the reboiler 48 with the outlet 30. The reboiler 48 is preferably of the thermosiphon type. The reboiler 48 can be heated by hot oil, for example, introduced into the reboiler 48 by a line 64 and withdrawn from the reboiler 48 by a line 66. A conduit means 68 connects the reboiler 48 to a vapor inlet 70 which is positioned adjacent the lower portion 20 of the column 16.

The reclaimer 50 can be connected to the lower portion 20 of the stripper 16 by a suitable conduit means 72 connecting the liquid outlet 30 and the reclaimer 50 and including the pump 54. The reclaimer 50 contains a heater 74 such as a tube bundle which can be heated by hot oil introduced into the reclaimer 50 by a line 76 and withdrawn by the line 78. A liquid outlet 80 in the lower portion of the reclaimer 50 is positioned so that solids which accumulate in the reclaimer 50 can be blown down therethrough. The outlet 80 is connected to a conduit 82 which conveys bottoms liquid away for further treatment and will generally be connected to a settler which may or may not be provided with a heater and means for returning vapor to the reclaimer 50. An upper portion of the reclaimer 50 is connected to the stripper 16 by a suitable conduit means 84. The conduit means 84 can include a packed section or trayed section or mist eliminator 86. In the illustrated embodiment, the conduit means 84 empties into the conduit means 68 although it could empty separately into the stripper 16 is desired, or empty into the conduit means 24 for example. The only essential feature of the conduit means 84 is that it be operable to return water to the solution circulating between the absorber 2 and the stripper 16 in the hereinafter described manner.

In accordance with the invention, raw make-up water is added to the reclaimer 50. This is advantageously accomplished by conduit 86 emptying directly into the reclaimer 50 although other means can be used as well.

According to the invention, a first gas stream containing at least one acid gas generally selected from the group consisting of $CO_2$ and $H_2S$ is contacted with an amine solution in a contacting zone. Generally, the first gas stream will enter absorber 2 at inlet 8 and the contacting will occur in the absorber 2, the amine solution being introduced into the absorber through inlet 12. The amine of the solution will typically be an alkanolamine containing less than 8 carbon atoms for reasons of solubility and boiling point and will generally be one of TEA, DEA, MDEA and MEA, with MEA being preferred because of its higher efficiency. The gas stream introduced into the contacting zone through inlet 8 will usually be natural gas containing predominantly methane, although other gas streams generally containing light hydrocarbons can be treated as well. The amine solution introduced into the absorber 2 through inlet 12 will generally contain from about 5 percent to about 50 percent by weight of the amine. Most units circulate between about 15 and 40 weight percent amine in aqueous solution. Conditions in the absorber 2 will generally include a temperature within the range from about 0 to about 100° C. and a pressure within the range of from about 0 to about 100 psig (pounds per square inch, gauge) (100–800 kPa). Generally, about 10 to 25 moles of amine will be introduced into the column for each mole of combined $H_2S$ and $CO_2$.

From the contacting zone 2 there is withdrawn a rich solution of the amine which is rich in the acid gas from the first gas stream. The rich solution can be withdrawn from absorber 2 through outlet 14 and is introduced into the stripping zone 16 through inlet 22 to ultimately produce a second gas stream leaving through the outlet 28 which contains the at least one acid gas and an equilibrium amount of water vapor. A first portion of this stream is used for reflux via 42 and a second portion 46 is generally routed for proper and safe disposal such as incineration or processing in a Claus unit for example. A lean amine solution is also produced in the stripping zone 16 which is lean in the acid gas.

A first portion of the lean amine solution thus produced is circulated to the contacting zone via conduit means 52. Generally, the lean amine solution is withdrawn from the stripping zone through outlet 30 pumped by pump 54 into the surge tank 58 and from the surge tank 58 by the action of pump 56 to liquid inlet 12 of the contacting zone. Generally, the rich solution of the amine carried by conduit means 24 and the lean solution of amine carried by the conduit means 52 will be circulated in indirect heat exchange relationship with each other such as in the heat exchanger which contains cooler 26 and heater 60. After passage through the heat exchanger the contents of the conduit means 52 are generally further cooled in a cooler not shown to a temperature suitable for efficiently absorbing the acid gases which were introduced into the absorber 2 via inlet 8.

A second portion of the lean amine solution is circulated to the distillation zone 50 to provide a third gas stream which contains predominantly water and amine and a liquid bottom stream which contains solids. Generally, the third gas stream will be carried by the conduit means 84 which connects the distillation zone 50 to the stripper 16. The liquid bottoms stream which contains the solids can be withdrawn from the distillation zone 50 by conduit 82 for example.

In accordance with the invention, a stream of dissolved or suspended solids-containing make-up water is introduced into the distillation zone. The water is distilled and the distilled water added to the amine solution via conduit means 84. The solids portion of the make-up water is withdrawn from the distillation zone in the liquid bottoms stream. With reference to the FIGURE, the stream of dissolved solids containing water can be introduced into the distillation zone 50 through conduit 86. The solids portion can be withdrawn from the zone 50 in the bottoms stream 82.

For good results, a third portion of the lean amine solution is generally circulated through a reboiler to convert at least a portion of this third portion into a fourth gas stream which is introduced into the stripping zone to strip the rich solution of at least a portion of the acid gas it contains. For example, the third portion can be withdrawn from the outlet 30 by conduit means 62 and introduced into the reboiler 48. The fourth gas stream can be withdrawn from the reboiler 48 through conduit means 68 and reintroduced into the stripper 16. It is advantageous in this embodiment to combine the third gas stream with the fourth gas stream, since they are both gases, contain both amine and water vapor, and have utility for stripping acid gas from the rich amine solutions.

After treatment in the absorber 2, a treated fifth gas stream is withdrawn via conduit 10. Generally, the fifth gas stream will contain a low concentration of the acid gas. It will also contain equilibrium amounts of water vapor and thus provide another escape path for water vapor from the amine treating unit. It is thus important that a sufficient amount of make-up water be introduced into the distillation unit 50 via the conduit 86 to make up for the water lost from the circulating amine solution through the second gas stream 46, the fifth gas stream 10, and the liquid bottom stream 82.

Reflux for the stripper 16 is generally provided by condensing a portion of the second gas stream and introducing the condensed portion into the stripping zone. This is conveniently accomplished by condensing a portion of the vapor leaving the stripper in the condenser 38, accumulating the condensed portion in the accumulator 34, and pumping the condensed portion via the pump 44 and conduit means 42 back into the stripping zone 16.

The invention is further illustrated by the following table which shows calculated compositions, mass balances, and temperatures where applicable:

TABLE I

| Conduit No. | 8 | 12 | 10 | 14 |
|---|---|---|---|---|
| Stream Name | Sour Gas | Monoethanol Amine Sol'n | Sweet Gas | Rich Amine |
| Components in Mols/Hr | | | | |
| Carbon Dioxide 44 MW | 30.1 | — | — | 30.1 |
| Hydrogen Sulfide 34 MW | 10.0 | — | — | 10.0 |
| Methane 16 MW | 336.9 | — | 336.9 | — |
| Ethane 30 MW | 131.8 | — | 131.8 | — |
| Propane 44 MW | 22.9 | — | 22.9 | — |
| Monoethanol amine 61 MW | — | 757 | — | 757 |
| Water 18 MW | — | 453 | 1.6 | 451.4 |
| Total Mol/Hr | 531.7 | 1210 | 493.2 | 1248.5 |
| MSCFD or GPM @ 60° F. | 4843 MSCFD | 108 GPM | 4478 MSCFD | 110 GPM |
| Sp. Gr. or °API @ 60° F. | 1.47 | 1.01 | 0.729 | 1.01 |
| Mol Wt. | 42.73 | 44.95 | 21.11 | 44.85 |
| Lbs/Hr | 12043 | 54400 | 10405 | 56038 |
| Temp, °F. | 55° F. | 90° F. | 65° F. | 85° F. |
| Pressure psia | 100 psia | 110 psia | 100 psia | 100 psia |
| State | Vapor | Liquid | Vapor | Liquid |

| Conduit No. | 46 | 72 | 82 | 86 |
|---|---|---|---|---|
| Stream Name | Stripper Ovhd | Reclaimer Feed | Reclaimer Btms To Disposal | Make-up Raw Water and Amine |
| Components in Mols/Hr | | | | |
| Carbon Dioxide 44 MW | 30.1 | — | — | — |
| Hydrogen Sulfide 34 MW | 10.0 | — | — | — |
| Methane 16 MW | — | — | — | — |
| Ethane 30 MW | — | — | — | — |
| Propane 44 MW | — | — | — | — |
| Monoethanol amine 61 MW | — | 15.2 | 1.9 | 1.9 |
| Water 18 MW | 0.1 | 9.0 | 1.1 | 2.8 |
| Total Mol/Hr | 40.2 | 24.2 | 3.0 | 4.7 |
| MSCFD or GPM @ 60° F. | 15.3 MSCFD | 2.2 GPM | 0.27 GPM | 0.42 GPM |
| Sp. Gr. or °API @ 60° F. | — | 1.01 | 1.02 | 1.02 |
| Mol Wt | 41.5 | 44.95 | 45.2 | 35.4 |
| Lb/Hr | 1668 | 1089 | 545 | 575 |
| Temp, °F. | 220° F. | 250° F. | 270° F. | 100° F. |
| Pressure, psia | 30 psia | 30 psia | 35 psia | 35 psia |
| State | Vapor | Liquid | Liquid | Liquid |

What is claimed is:

1. In a process comprising
   (a) contacting a first gas stream containing at least one acid gas selected from the group consisting of $CO_2$ and $H_2S$ with an amine solution in a contacting zone;
   (b) withdrawing from the contacting zone a rich solution of the amine which is rich in the acid gas from the first gas stream;
   (c) introducing the rich solution into a stripping zone to produce a second gas stream containing the at least one acid gas and water vapor and a lean amine solution which is lean in the acid gas;
   (d) circulating a first portion of the lean amine solution to the contacting zone; and
   (e) circulating a second portion of the lean amine solution to a distillation zone to provide a third gas stream which contains predominantly water and amine and a liquid bottoms stream which contains solids;
   the improvement which comprises
   (f) introducing a stream of dissolved or suspended solids containing make-up water into the distillation zone, solids of the make-up water being withdrawn from the distillation zone in the liquid bottoms stream.

2. A process as in claim 1 further comprising circulating a third portion of the lean amine solution through a reboiler to convert at least a portion of said third portion into a fourth gas stream and introducing the fourth gas stream into the stripping zone to strip the rich solution of at least a portion of the acid gas it contains, and condensing a portion of the second gas stream and supplying it to the stripping zone as reflux.

3. A process as in claim 2 further comprising combining the third gas stream with the fourth gas stream.

4. A process as in claim 3 further comprising withdrawing a fifth gas stream from the contacting zone which contains a low concentration of acid gas and water vapor, wherein a sufficient amount of make-up water is introduced into the distillation zone to make up for the water lost from the amine solution in the portion of second gas stream not used for reflux, the fifth gas stream, and the liquid bottoms stream.

5. A process as in claim 3 wherein the amine is selected from the group consisting of monoethanolamine, diethanolamine, and methyl diethanolamine.

6. A process as in claim 3 wherein the lean amine solution contains between about 5 and about 50 weight percent of the amine.

* * * * *